US009577947B2

United States Patent
Wu et al.

(10) Patent No.: US 9,577,947 B2
(45) Date of Patent: Feb. 21, 2017

(54) SYSTEM AND ARCHITECTURE TO OPTIMIZE VIDEO TRAFFIC OVER INTERNET PROTOCOL NETWORKS

(71) Applicant: Cisco Technology, Inc., San Jose, CA (US)

(72) Inventors: Duanpei Wu, San Jose, CA (US); Shih-Cheng Yang, Saratoga, CA (US); Wenyi Wang, Cupertino, CA (US); Anand Oswal, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 13/946,086

(22) Filed: Jul. 19, 2013

(65) Prior Publication Data

US 2015/0023169 A1    Jan. 22, 2015

(51) Int. Cl.
*H04L 12/863* (2013.01)
*H04N 7/15* (2006.01)
*H04L 12/853* (2013.01)
*H04L 29/06* (2006.01)

(52) U.S. Cl.
CPC ....... *H04L 47/6215* (2013.01); *H04L 47/2416* (2013.01); *H04L 65/403* (2013.01); *H04L 65/605* (2013.01); *H04L 65/608* (2013.01); *H04N 7/152* (2013.01)

(58) Field of Classification Search
None
See application file for complete search history.

(56) References Cited

U.S. PATENT DOCUMENTS

| | | | |
|---|---|---|---|
| 5,463,620 A * | 10/1995 | Sriram | 370/412 |
| 6,788,646 B1 * | 9/2004 | Fodor et al. | 370/230 |
| 8,355,041 B2 * | 1/2013 | Chen et al. | 348/14.12 |
| 2002/0036984 A1 * | 3/2002 | Chiussi | H04L 12/5602 370/232 |
| 2005/0226249 A1 * | 10/2005 | Moore | 370/395.21 |
| 2006/0120282 A1 * | 6/2006 | Carlson | H04L 12/2602 370/229 |
| 2006/0156363 A1 * | 7/2006 | Wu et al. | 725/113 |
| 2007/0153916 A1 * | 7/2007 | Demircin et al. | 375/240.26 |
| 2007/0211798 A1 * | 9/2007 | Boyce et al. | 375/240.16 |
| 2008/0101410 A1 * | 5/2008 | Barkley et al. | 370/473 |
| 2009/0052540 A1 * | 2/2009 | Gutman | H04N 21/23439 375/240.24 |
| 2009/0207234 A1 * | 8/2009 | Chen et al. | 348/14.09 |
| 2010/0121971 A1 * | 5/2010 | Shao et al. | 709/231 |

(Continued)

*Primary Examiner* — Chirag Shah
*Assistant Examiner* — Rina Pancholi
(74) *Attorney, Agent, or Firm* — Edell, Shapiro & Finnan, LLC (57) ABSTRACT

Techniques are provided for managing network traffic and alleviating network congestion issues in video conference environments. At a video conference bridge device configured to send and receive communications to an endpoint device in a network, one or more video streams are received from the endpoint participating in a video conference. Each of the video streams is classified as a rate adaptive stream or as a non-rate adaptive stream. For video streams classified as rate adaptive streams, the video streams are assigned to a buffer queue for rate adaptive streams. For video streams classified as non-rate adaptive streams, the video streams are assigned to a buffer queue for non-rate adaptive streams.

21 Claims, 6 Drawing Sheets

(56) References Cited

U.S. PATENT DOCUMENTS

| | | | |
|---|---|---|---|
| 2012/0120184 A1* | 5/2012 | Fornell et al. | 348/14.12 |
| 2012/0120270 A1* | 5/2012 | Li et al. | 348/222.1 |
| 2012/0127259 A1* | 5/2012 | Mackie et al. | 348/14.07 |
| 2012/0179774 A1* | 7/2012 | Badheka et al. | 709/217 |
| 2013/0135427 A1* | 5/2013 | Wu | H04N 21/23655 348/14.09 |
| 2013/0205002 A1* | 8/2013 | Wang et al. | 709/224 |
| 2014/0313989 A1* | 10/2014 | Doken et al. | 370/329 |

* cited by examiner

SYSTEM AND ARCHITECTURE TO OPTIMIZE VIDEO TRAFFIC OVER INTERNET PROTOCOL NETWORKS

TECHNICAL FIELD

The present disclosure relates to managing network traffic in video conference environments.

BACKGROUND

In a video conference environment, endpoint devices may send and receive communications (e.g., video streams) to each other via a video conference bridge. The video streams sent by the endpoint devices may be rate adaptive streams or non-rate adaptive streams. Likewise, the endpoint devices themselves may be rate adaptive endpoint devices or non-rate adaptive endpoint devices. Rate adaptive streams utilize adaptive bit rate streaming techniques to adjust the throughput or bit rate of the video streams based on the available bandwidth in a network. For example, rate adaptive endpoint devices may be configured to detect available bandwidth capacities in a network, and based on the available bandwidth, the rate adaptive endpoint devices can adjust the video quality of the rate adaptive streams to ensure proper delivery of the video to endpoint devices in the network. The throughput of non-rate adaptive streams, however, is not configured to be adjusted in response to the available bandwidth in a network.

DESCRIPTION OF EXAMPLE EMBODIMENTS

Overview

Techniques are provided for managing network traffic and alleviating network congestion issues in video conference environments. At a video conference bridge device configured to send and receive communications to an endpoint device in a network, one or more video streams are received from the endpoint participating in a video conference. Each of the video streams is classified as a rate adaptive stream or as a non-rate adaptive stream. For video streams classified as rate adaptive streams, the video streams are assigned to a buffer queue for rate adaptive streams. For video streams classified as non-rate adaptive streams, the video streams are assigned to a buffer queue for non-rate adaptive streams.

Example Embodiments

The techniques described herein involve managing communications between video endpoint devices in a video conferencing network and minimizing traffic congestion problems that may result from these communications. An example system/network topology (hereinafter "system") is shown at reference numeral 100 in FIG. 1. The system 100 represents, for example, a video conference system or network. The system 100 has a plurality of endpoint devices, shown at reference numerals 102(1)-102(*n*). The system also has a video conference bridge device ("video conference bridge"), shown at reference numeral 104. The endpoint devices 102(1)-102(*n*) may be audio/video endpoint devices that are configured to communicate with each other and with the video conference bridge 104 via a communications network ("network") shown at reference numeral 106.

Each of the endpoint devices 102(1)-102(*n*) may serve a plurality of participants. The participants (not shown in FIG. 1) may be human or automated participants of an audio/video conference and may be located at one or more of the endpoint devices 102(1)-102(*n*). During the course of the conference session, the participants communicate with one another via their respective endpoint devices 102(1)-102(*n*). It should be appreciated that the system 100 may contain any number of endpoint devices and that any number of participants may be located at each of the endpoint devices 102(1)-102(*n*).

Figure 1:
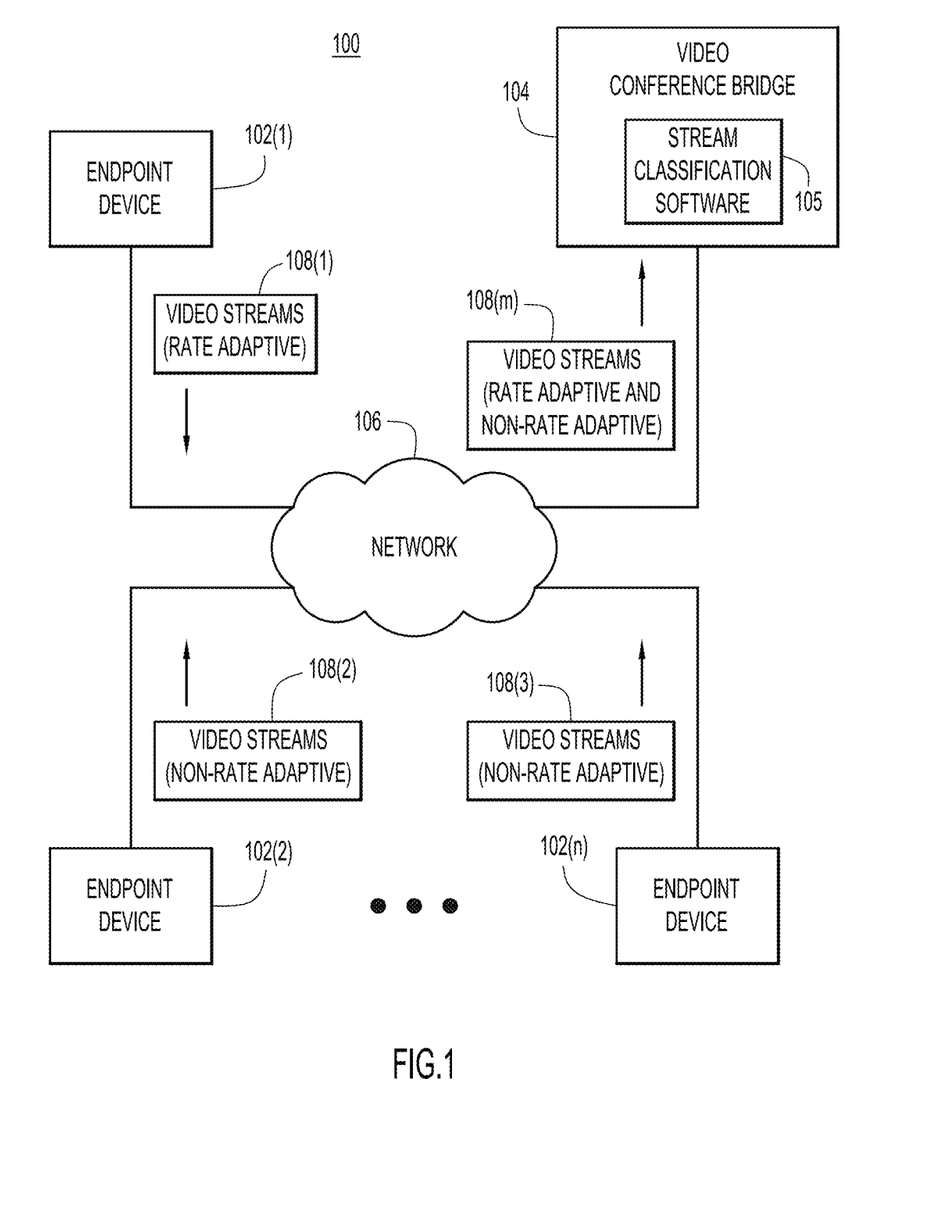
FIG. 1 shows an example video network environment featuring a video conference bridge device that is configured to classify video streams as rate adaptive streams and/or non-rate adaptive streams.

In general, the endpoint devices 102(1)-102(*n*) may be any device that is configured to capture, send and receive audio and video data (e.g., video streams), for example, of the participants and of other material presented during the conference, such as documents, images, videos, etc. The endpoint devices 102(1)-102(*n*) are also configured to display the video streams to the participants. For example, the endpoint devices 102(1)-102(*n*) may be any audio/video teleconference video device, web camera or video enabled laptop device, mobile device, tablet, computer, etc.

In one example, the endpoint devices 102(1)-102(*n*) may send and receive video streams to each other and to the video conference bridge 104. The video streams are shown at reference numerals 108(1)-108(*m*) in FIG. 1. For example, the video streams shown at reference numeral 108(1) may be sent by endpoint device 102(1) and may be destined for endpoint device 102(2), and in the course of being sent to endpoint device 102(2), the video streams 108(1) may be received and evaluated by the video conference bridge 104. Likewise, other video streams may be similarly sent in the system 100 by other endpoint devices. The video conference bridge 104 is configured with stream classification software 105. The stream classification software 105 enables the video conference bridge 104 to evaluate the video streams and classify the video streams as rate adaptive streams and/or non-rate adaptive streams in order to manage communications within the system 100 and to alleviate potential network congestion problems that may arise when the video streams 108(1)-108(*m*) are sent within the system 100. These techniques are described in detail herein.

The video conference bridge 104 may be any device that is configured to send and receive the video streams 108(1)-108(*m*) to and from one or more of the endpoint devices 102(1)-102(*n*). Additionally, as described by the techniques herein, the video conference bridge 104 may be any device that is configured to evaluate the video streams 108(1)-108

(m) in order to classify them as rate adaptive streams or non-rate adaptive streams, and to forward the streams in the system 100, as necessary.

As shown in FIG. 1, the endpoint devices 102(1)-102(n) may send corresponding video streams in the system 100. These video streams may be sent in the system 100 at various throughputs or data rates. Video streams may be sent at various data rate levels, and these data rates are typically based on the size of the video file that is being sent per second. For example, the data rates of the video streams are typically measure by bit rates, which indicate the number of bits (or kilobits, megabits, etc.) per second of the video file being sent.

Video streams may be sent at different bit rates, depending on the type of video file being sent. For example, some video streams may comprise video files or frames such as intra-coded frames or "I-frames" (e.g., key frames), predicted frames or "P-frames," and bi-directional predicted frames or "B-frames." The bit rates of the video streams may be different depending on the nature of these video files (e.g., how the video files are encoded). For example, video frames of a video stream that contains a multitude of I-frames may be large, and thus may have a higher bit rate, when compared to video frames of a video stream with a smaller number of I-frames. In another example, the content (e.g., frame rate) of the video files within a video stream itself may cause it to have a high bit rate relative to other video streams in the system 100.

When compared to video streams with relatively low bit rates, video streams with relatively high bit rates require higher bandwidth in order to be sent within the system 100. Often times, video streams with relatively high bit rates may approach or exceed bandwidth capacities of the system 100, especially if other video streams also with relatively high bit rates are being sent in the system 100 concurrently. When this happens, packets of video streams are often dropped, which degrade the video quality of the video streams. Additionally, as a result of the dropped packets, destination endpoint devices in the system 100 may request additional video frames (e.g., I-frames), which further increases the bit rate of the video streams, thus resulting in more dropped packets of the video streams. Such network congestion is problematic, since destination endpoint devices in the system 100 may not be able to adequately participate in a video conference due to the degraded video quality of the video streams.

To address the issues of network congestion, data rate adaptation techniques may be applied to one or more of the video streams. That is, one or more of the video streams may be a rate adaptive stream. Similarly, one or more endpoint devices may be configured to apply the rate adaption techniques. These endpoint devices are known as rate adaptive endpoint (e.g., "RAEP") devices. When rate adaptive video streams are sent in a network, the bit rates of the video streams can be adjusted based on the bandwidth capacity of the network or system in which the video streams are being sent. Thus, if a video stream has a relatively high bit rate, but the system in which the video stream is being sent has a relatively small amount of bandwidth available for data transmissions, the bit rate of the video stream can be reduced, using rate adaptation, to enable the video stream to be sent in the system without exceeding the bandwidth capacities. This adjustment to the bit rate may be temporary and can be made in real-time in response to network conditions such that the video stream is delivered properly to destination endpoint devices with minimal packet loss. In one example, rate adaption techniques may be performed by rate adaptive endpoint devices that are configured to adjust (e.g., lower or reduce) the bit rate of video streams in response to network bandwidth capacities and availabilities.

However, in some cases, a system may include both rate adaptive endpoint devices and non-rate adaptive endpoint (e.g., "non-REAP") devices. For example, in FIG. 1, endpoint device 102(1) may be a rate adaptive endpoint device, but endpoint device 102(2) and endpoint device 102(n) (to which, e.g., video streams 108(1) are being sent) may be a non-rate adaptive endpoint device. Thus, the bit rate of the video streams 108(1) sent by the rate adaptive endpoint device 102(1) may be reduced using rate adaptation techniques in response to network conditions, but rate adaption techniques may not be useful in reducing the bit rate of the video streams 108(2) and 108(3) (which are, in this example, non-rate adaptive streams). As a result, when the rate adaptive endpoint 102(1) sends rate adaptive video streams 108(1) and when non-rate adaptive endpoints 102(2) and 102(n) send non-rate adaptive video streams 108(2) and 108(3), the rate adaptive video streams and the non-rate adaptive video streams compete with each other for network bandwidth in the system 100. Likewise, the video conference bridge 104 may receive both rate adaptive streams and non-rate adaptive streams, as shown at reference numeral 108(m) in FIG. 1. Due to the aggressive behavior of non-rate adaptive streams (e.g., since rate adaptive techniques are not applied to these streams), network congestion may result, especially if the non-rate adaptive streams have a relatively high bit rate. That is, since the bit rate of the non-rate adaptive streams is not adjusted using rate adaptive techniques, the non-rate adaptive endpoints will send video streams at a high bit rate and will increase the bit rate of a video streams to a point that may exceed the bandwidth limits of the system 100. As stated above, this results in packet drops and a degradation of video quality.

Additionally, when the system 100 has both rate adaptive endpoint devices that send rate adaptive video streams and non-rate adaptive endpoint devices that send non-rate adaptive video streams, problems may result that pertain to oversubscription within the system 100. For example, the system 100 may be provisioned with a Call Admission Control (CAC) policy. In general, the CAC policy operates on the principle that the bit rate of video streams vary with the content that it carries, and at times, the average bit rate of video streams being sent in the system 100 is less than the maximum allowable bit rate of the system 100 (e.g., as determined by the bandwidth capacity of the system 100). The CAC policy allows the system 100 to take advantage of this characteristic to oversubscribe video streams to the system 100, with the assumption that the average bit rate of the video streams will be less than the maximum allowable bit rate.

However, in situations where both rate adaptive streams and non-rate adaptive streams are being sent in the network, the oversubscription enabled by the CAC policy may lead to network congestion. For example, for non-rate adaptive streams, when there is a packet drop/loss, the non-rate adaptive endpoint devices may send the video streams at a bit rate close to the maximum (e.g., in response to a request for a packet by another endpoint device). In other words, the non-rate adaptive endpoints will become more aggressive with respect to increasing bit rates when experiencing packet drops. Thus, multiple non-rate adaptive endpoint devices may all send video streams at bit rates close to the maximum allowable bit rate. This results in more severe congestion and will cause higher instances of packet drops, and accordingly, the rate adaptive endpoints will be impacted by adjusting bitrates downward significantly. This also causes an oversubscription problem, since, contrary to the assumption by the CAC policy, the average bit rate of video streams in the system 100 approaches the maximum allowable bit rate. This limits the number of video streams that can be successfully transmitted in a network, and thus leads to further network congestion problems. For example, due to the lack of enough available bandwidth in the system 100, the non-rate adaptive video streams with high bit rates will further cause more packet drops, and potentially, all of the non-rate adaptive endpoints may send video streams at high bit rates.

The techniques described herein overcome these problems. In particular, the techniques herein describe solutions for the network congestion problems that result from the interference of both rate adaptive streams and non-rate adaptive streams in the system 100 and also provide CAC improvement for rate adaptive streams and non-rate adaptive streams. For example, the techniques herein relate to the video conference bridge 104 being configured to differentiate between the rate adaptive streams and the non-rate adaptive streams and to assign each of the streams to appropriate buffer queues for transmission in the system 100.

Figure 2:
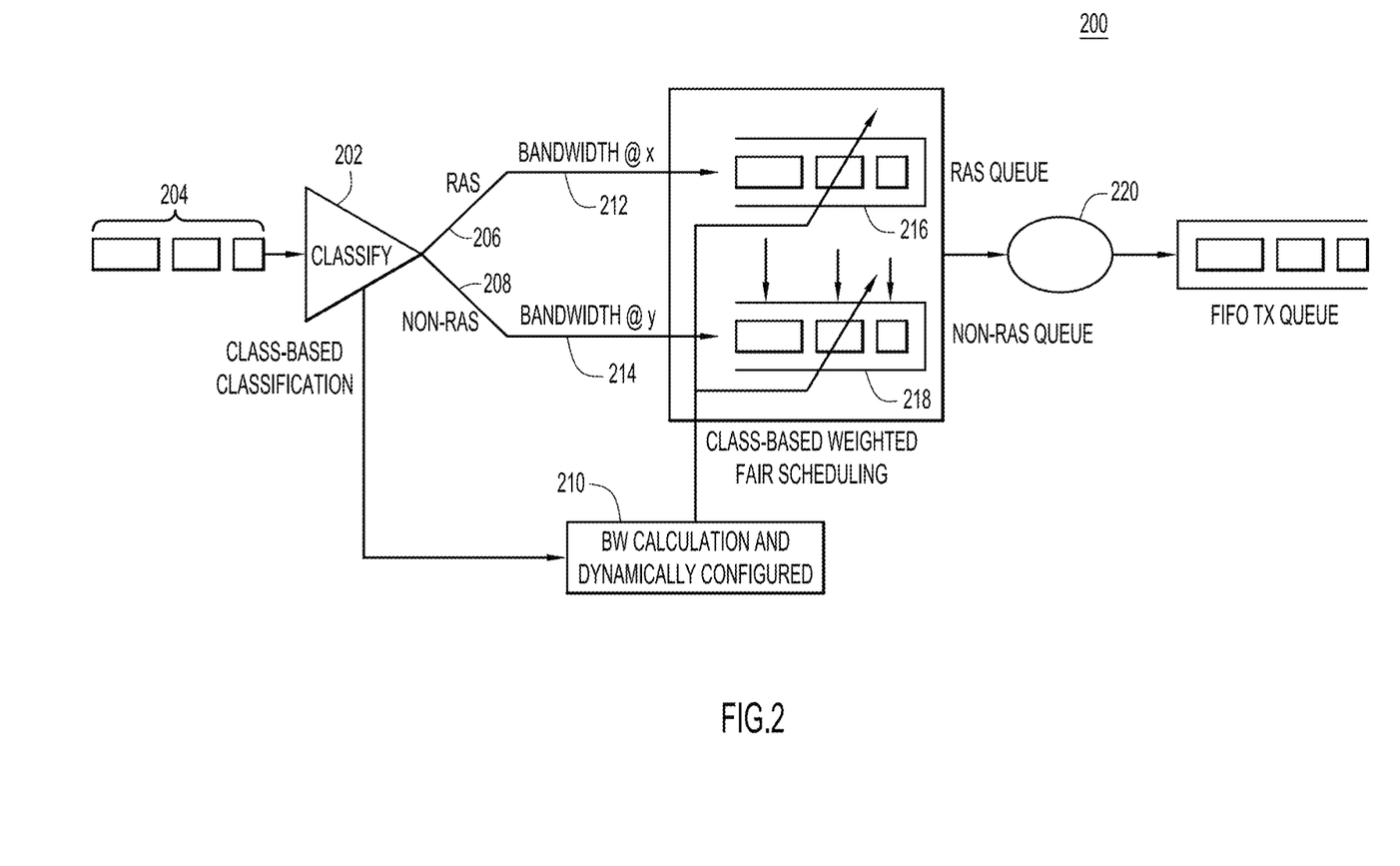
FIG. 2 is an example diagram depicting the logical flow of the video conference bridge device classifying the video streams as rate adaptive streams and non-rate adaptive streams.

Reference is now made to FIG. 2, which shows an example diagram 200 depicting the logical flow of the video conference bridge 104 classifying video streams as rate adaptive streams and as non-rate adaptive streams. Reference numeral 202 shows a classification module that receives video streams, represented at reference numeral 204. The classification module 202 of the video conference bridge 104 evaluates the video streams and classifies each of the video streams as either a rate adaptive stream, as shown at reference numeral 206, or as a non-rate adaptive stream, as shown at reference numeral 208. Simultaneously, the classification module 202 of the video conference bridge, at 210 calculates the total bandwidth of the system 100. At 212 and 214, bandwidth calculations are determined for the rate adaptive video streams and the non-rate adaptive video streams, respectively. For example, the bandwidth calculations for the rate adaptive video streams and for the non rate adaptive video streams are calculated dynamically based on the stream types and the total required bit rate for the video streams. The rate adaptive video streams and the non-rate adaptive video streams are then assigned to respective buffer queues, as shown at 216 and 218 and are transmitted in the system 100 (e.g., to the appropriate destination endpoint device), as shown at reference numeral 220.

By classifying the video streams as either rate adaptive streams or non-rate adaptive streams and assigning them to separate respective buffer queues, interference is avoided between the rate adaptive streams and the non-rate adaptive streams. That is, each of the buffer queues is configured with a minimum guaranteed bandwidth. As a result, non-rate adaptive streams do not compete for the same bandwidth as rate adaptive streams, and thus, when the bit rates of non-rate adaptive streams increase (e.g., due to packet drops/losses), the relatively high bit rates of these non-rate adaptive streams do not consume bandwidth that is allocated for the rate adaptive streams. In other words, by maintaining the rate adaptive streams and the non-rate adaptive streams in separate buffer queues, the video conference bridge 104 can allocate appropriate bandwidth budgets for rate adaptive video streams and non-rate adaptive video streams without these video streams competing for the same allocated bandwidth in the system 100.

The bandwidth that is allocated to the rate adaptive stream buffer queue and the non-rate adaptive stream buffer queue depends on the total bit rate assigned to each buffer queue, an oversubscription factor associated with each buffer queue and the behavior of the video streams. Since the bit rates of non-rate adaptive streams are, by definition, unable to be adjusted or adapted to network conditions, the buffer queue for non-rate adaptive bit streams typically does not allow much, if any, oversubscription. Additionally, the buffer queue of the non-rate adaptive streams is typically allocated a bandwidth that approaches the sum of the maximum bit rates of all of the video streams in the buffer queue (subject to a weighted factor), since the bit rates of these video streams cannot be adjusted. The buffer queue of the rate adaptive streams, however, is typically allocated a remaining bandwidth in the system (e.g., the bandwidth remaining after removing the bandwidth allocated for the buffer queue for non-rate adaptive streams from the total allocated bandwidth in the system 100).

Specifically, the buffer queue of the non-rate adaptive streams is allocated a bandwidth according to the following formula:

$$BW_{non-RAS}=w(N)\Sigma maxBR(n), n=1, \ldots N,$$

where $BW_{non-RAS}$ is the bandwidth for the buffer queue for non-rate adaptive streams, maxBR(n) is the maximum bit rate for each of the plurality of video streams in the buffer queue for non-rate adaptive streams and w(N) is a weighted factor for a total number of N video streams. The weighted factor is a function of the total number of video streams. For example, the weighted factor could be set to one as a default value. The value will be close to one when the number of streams ("N") is a small number (e.g., two or three). For a large number of streams, the weighted factor could be reduced. The maximum bit rate for each of the plurality of video streams may be obtained, for example, from signaling information in the video streams. For example, for the maximum bit rate for each of the plurality of video streams may be obtained from Session Description Protocol (SDP) information in a Session Initiation Protocol (SIP) message. Additionally, when the maximum bit rate is not available from the signaling information in the video streams, the maximum bit rate, instead, can be estimated from the real-time bit rate over a long period of time for each video stream. Typically, for non-rate adaptive streams, the real time bit rate is close to a maximum allowable bit rate.

As stated above, the buffer queue of the rate adaptive streams is allocated a remaining bandwidth in the system 100. For example, the bandwidth for the buffer queue of the rate adaptive streams is determined according to the following formula:

$$BW_{RAS}=BW_{Total}-BW_{non-RAS},$$

where $BW_{RAS}$ is the total bandwidth for the buffer queue of the rate adaptive streams, $BW_{Total}$ is the total bandwidth allocated for video streams in the system 100, and where $BW_{non-RAS}$ is the bandwidth for the buffer queue for non-rate adaptive streams.

Figure 3:
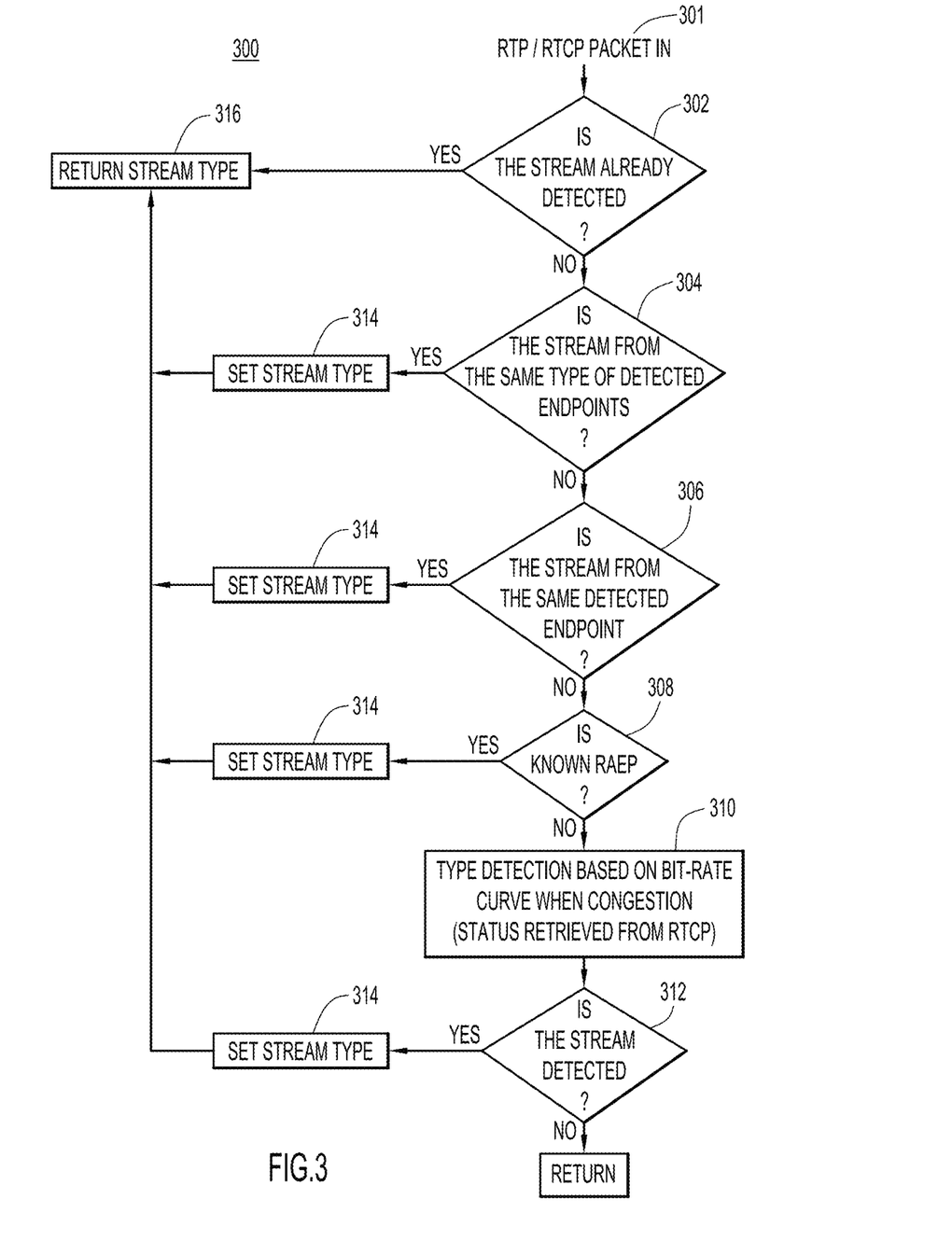
FIG. 3 shows an example flow chart depicting operations for classifying the video streams.

Reference is now made to FIG. 3. FIG. 3 shows an example flow chart 300 depicting operations for classifying the video streams as rate adaptive video streams and as non-rate adaptive video streams. The flow chart 300 shows operations performed by the video conference bridge 104 receiving a Real-time Transport Protocol (RTP) or Real-time Transport Control Protocol (RTCP) message at 301. The video conference bridge 104 identifies the type of endpoint from which a video stream originates in order to classify the video stream as a rate adaptive stream or as a non-rate adaptive stream. At operation 302, the video conference bridge 104 determines whether or not the video stream has been classified. If not, at operation 304 the video conference bridge 104 determines if the stream is from a same type of detected endpoint and at operation 306 determines if the stream is from the same detected endpoint. For example, the video conference bridge 104 will detect the stream types (e.g., as rate adaptive or non-rate adaptive). It is assumed that non-rate adaptive streams come only from non-rate adaptive endpoints, but the video conference bridge 104 will process all of the streams regardless of the classification.

At operation 308, the video conference bridge 104 determines whether or not the endpoint from which the video stream originated is a rate adaptive endpoint device. If so, signatures of the video stream (e.g., RTCP signaling information) can indicate whether or not the video stream is a rate adaptive stream or a non-rate adaptive stream. If the video conference bridge 104 determines that the endpoint from which the video stream originated is not a rate adaptive endpoint device (e.g., a general endpoint device), the video stream can be classified based on an observation that for non-rate adaptive streams, the bit rate is never reduced and instead, increases up to a maximum. Thus, if the bit rate of the video stream has been increased to a maximum bit rate allowed, the video stream is classified as a non-rate adaptive stream. On the other hand, if the bit rate of the video stream has not been increased to the maximum bit rate allowed, the video stream is classified as a rate adaptive stream.

In most situations where the bit rate increases for non-rate adaptive streams, network congestion occurs due to I-frame/Instantaneous Decoder Refresh (IDR) requests and responses. On the contrary, for rate adaptive streams, the bit rate may increase slightly during network congestion, but this increase is temporary and is reduced shortly after being increased. Thus, at operation 310, if the endpoint device from which the video stream originated is not a rate adaptive endpoint device, the video conference bridge 104 evaluates, e.g., a bit rate curve to determine whether or not a video stream is a rate adaptive stream or a non-rate adaptive stream, and returns the result at operation 312. At operation 314, the stream type is set, and at operation 316, the stream type classification is designated by the video conference bridge 104.

Figure 4:
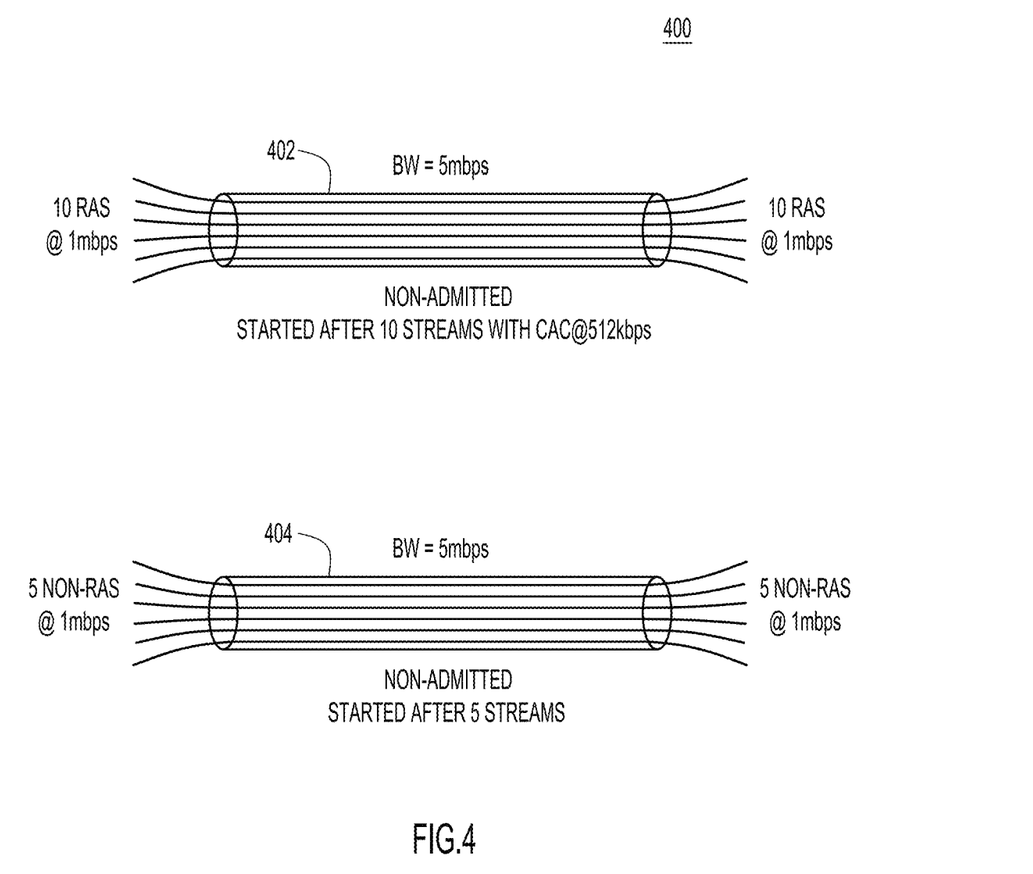
FIG. 4 is an example diagram depicting operations for provisioning the rate adaptive streams and the non-rate adaptive streams with separate video stream capacity limits.

Reference is now made to FIG. 4. As stated above, the techniques described herein also alleviate network congestion issues that result from rate adaptive streams and non-rate adaptive streams provisioned under a CAC policy. FIG. 4 shows an example diagram 400 of the video conference bridge 104 provisioning rate adaptive streams and non-rate adaptive streams with different CAC policies. This enables the rate adaptive streams to have separate video stream capacity limits from the non-rate adaptive streams. In FIG. 4, one or more video streams have been classified as either rate adaptive or as non-rate adaptive video streams. The rate adaptive video streams are admitted (e.g., allocated) into a first CAC queue, shown at reference numeral 402, and the non-rate adaptive video streams are admitted, separately, into a second CAC queue, shown at reference numeral 404. The first CAC queue has a higher video stream capacity limit (e.g., available bandwidth and maximum allowable bit rate) when compared to the video stream capacity limit of the second CAC queue.

For example, assuming the total bandwidth for each CAC queue of rate adaptive streams and non-rate adaptive streams is five megabits per second (Mbps) and also assuming that each video stream has a maximum bit rate of one Mbps, the oversubscription levels for the CAC queue with the non-rate adaptive streams is relatively low, due to the potential scenario where all of the non-rate adaptive streams increase to the maximum bit rate of one Mbps. On the other hand, for the CAC queue with rate adaptive streams, the oversubscription rate may be set to be double the capacity established by the total bandwidth for the queue. That is, when the total bandwidth for the CAC queue with rate adaptive streams is assumed to be five Mbps, the CAC oversubscription limit for this CAC queue is ten rate adaptive streams (i.e. a ten Mbps limit). The CAC queue for the rate adaptive streams has an oversubscription allowance (e.g., for double the number of streams) because each of the rate adaptive streams has a maximum bit rate of one Mbps and also has the capability of having their bit rates adjusted downward in the case of network congestion. In comparison, when the total bandwidth for the CAC queue with non-rate adaptive streams is assumed to be five Mbps the CAC oversubscription limit for this CAC queue is five non-rate adaptive streams (i.e. five Mbps), since it is assumed that the non-rate adaptive streams will often be sent at their maximum bit rate of one Mbps. It should be appreciated that when there is no network congestion, the bit rate of the rate adaptive streams will not be adjusted downward, and thus, the video quality of these video streams will not be affected. Thus, the CAC queue of the rate adaptive streams may be provisioned with oversubscription characteristics (and thus increased bandwidth support) while the CAC queue of the non-rate adaptive streams might not be provisioned with oversubscription characteristics.

Figure 5:
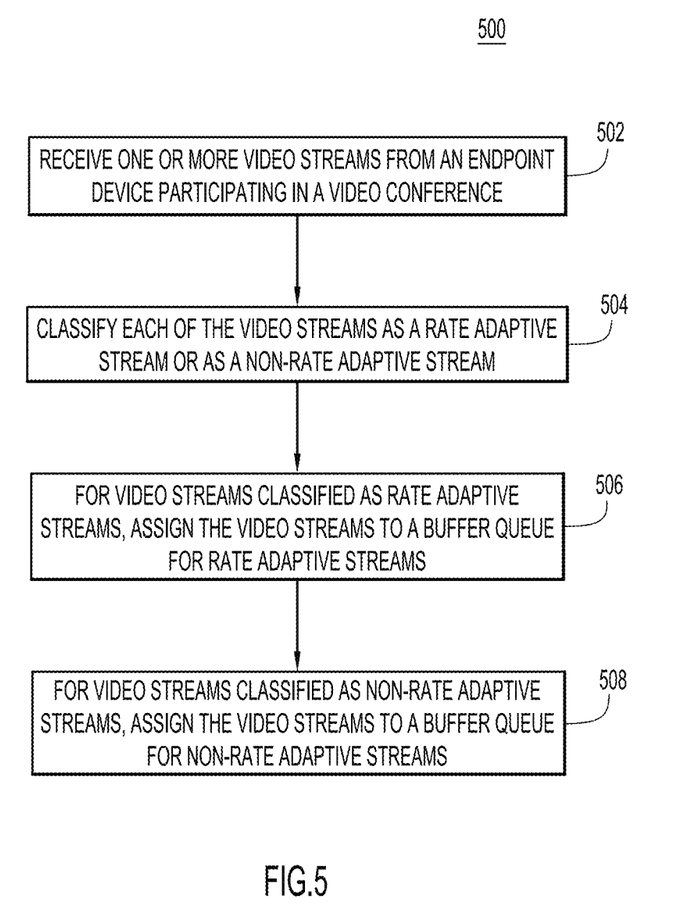
FIG. 5 is an example flow chart depicting operations performed by the video conference bridge device to assign the video streams into buffer queues for rate adaptive streams and non-rate adaptive streams.

Reference is now made to FIG. 5, which shows an example flow chart 500 depicting operations performed by the video conference bridge 104. At reference numeral 502, the video conference bridge 104 receives one or more video streams from an endpoint device participating in a video conference. At operation 504, each of the video streams is classified as a rate adaptive stream or as a non-rate adaptive stream. For video streams classified as rate adaptive streams, the video conference bridge 104, at 506, assigns the video streams to a buffer queue for rate adaptive streams. For video streams classified as non-rate adaptive streams, the video conference bridge 104, at 508, assigns the video streams to a buffer queue for non-rate adaptive streams.

Figure 6:
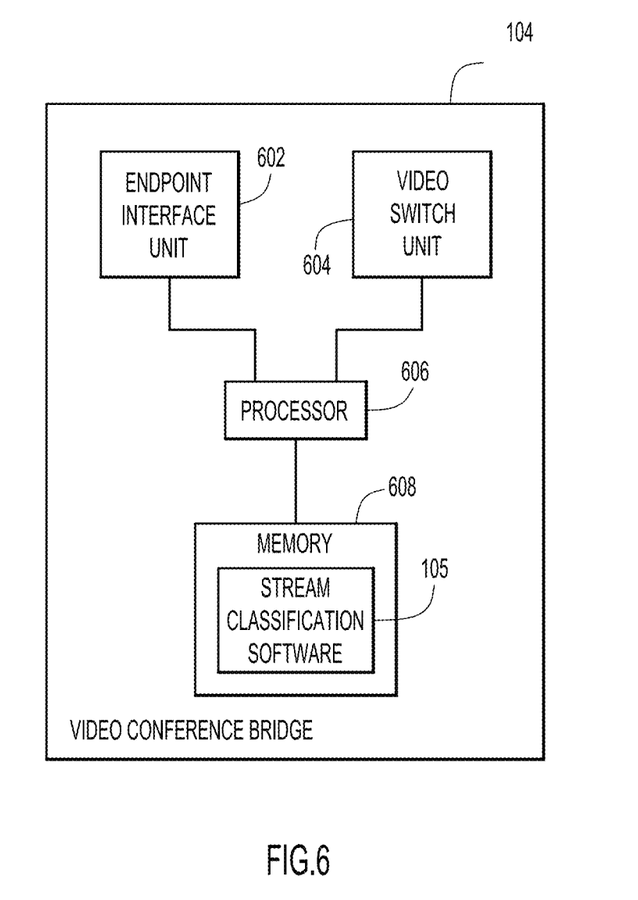
FIG. 6 is an example of a block diagram of the video conference bridge device configured to classify the video streams and to assign the video streams into buffer queues.

Reference is now made to FIG. 6, which shows a block diagram of the video conference bridge 104. The video conference bridge 104 comprises, among other components, an endpoint interface unit 602, a video switch unit 604, a processor 606 and a memory 608. The endpoint interface unit 602 is configured to receive messages (e.g., video streams 108(1)-108(m)) from the endpoint devices 102(1)-102(n) and to send messages to the endpoint devices 102(1)-102(n). In general, the endpoint interface unit 602 is a network interface unit or device, e.g., Ethernet card, configured to send and receive messages over a network. To this end, it may receive any type of video frames of a video stream. For example, the endpoint interface unit 602 may receive video frames such as I-frames, P-frames, B-frames, etc.

The video switch unit 604 is configured to receive video frames from the endpoint interface unit 602 and to determine endpoint device(s) in the system 100 to which the video frames should be routed. The video switch unit 604 enables the video conference bridge 104 to pass video streams from one endpoint device to another in the system 100. For voice-activated video switch conferences, the source endpoint device is usually the endpoint device with the loudest participant or current active speaker. When the loudest participant or current active participant switches, the video stream from the current active participant will switch accordingly.

The endpoint interface unit and the video switch unit 604 are coupled to the processor 606. The processor 606 is, for example, a microprocessor or microcontroller that is configured to execute program logic instructions for carrying out various operations and tasks described herein. For example, the processor 606 can execute the stream classification software 105 stored in memory 608 in order to evaluate video streams and to classify the video streams as rate adaptive streams and/or non-rate adaptive streams, as described by the techniques herein. The memory 608 may comprise read only memory (ROM), random access memory (RAM), magnetic storage media, optical storage media, flash memory, electrical, or other physical/tangible (non-transitory) memory.

The functions of processor 606 may be implemented by logic encoded in one or more tangible computer readable media (e.g., embedded logic such as an application specific integrated circuit, digital signal processor instructions, software that is executed by a processor, etc.) wherein memory 608 stores data used for the operations described herein and stores software or processor executable instructions that are executed to carry out the operations described herein.

The stream classification software 105 may take any of a variety of forms, so as to be encoded in one or more tangible computer readable memory media or storage device (e.g., memory 608) for execution, such as fixed logic or programmable logic (e.g., software/computer instructions executed by a processor). In some embodiments, the processor 606 is an application specific integrated circuit (ASIC) that includes fixed digital logic, programmable logic, or a combination thereof. For example, the processor 606 may be embodied in digital logic gates in a fixed or programmable digital logic integrated circuit, where the digital logic gates are configured to perform instructions of the stream classification software 105. In another form, the stream classification software 105 may be embodied in one or more tangible computer readable storage media encoded with software comprising computer executable instructions that when executed are operable to perform the operations described herein.

It should be appreciated that the techniques described above in connection with all embodiments may be performed by one or more computer readable storage media that is encoded with software comprising computer executable instructions to perform the methods and steps described herein. For example, the operations performed by the video conference bridge 104 may be performed by one or more computer or machine readable storage media or device executed by a processor and comprising software, hardware or a combination of software and hardware to perform the techniques described herein.

In summary, a method is provided comprising: at a video conference bridge configured to send and receive communications to an endpoint device in a network, receiving one or more video streams from the endpoint device participating in a video conference; classifying each of the video streams as a rate adaptive stream or as a non-rate adaptive stream; for video streams classified as rate adaptive streams, assigning the video streams to a buffer queue for rate adaptive streams; and for video streams classified as non-rate adaptive streams, assigning the video streams to a buffer queue for non-rate adaptive streams.

Furthermore, one or more computer readable media is provided comprising instructions operable to: receive one or more video streams from an endpoint device participating in a video conference; classify each of the video streams as a rate adaptive stream or as a non-rate adaptive stream; for video streams classified as rate adaptive streams, assign the video streams to a buffer queue for rate adaptive streams; and for video streams classified as non-rate adaptive streams, assign the video streams to a buffer queue for non-rate adaptive streams.

Additional, an apparatus is provided comprising: a network interface unit configured to enable communications over a network; and a processor coupled to the network interface unit, and configured to: receive one or more video streams from an endpoint device participating in a video conference; classify each of the video streams as a rate adaptive stream or as a non-rate adaptive stream; for video streams classified as rate adaptive streams, assign the video streams to a buffer queue for rate adaptive streams; and for video streams classified as non-rate adaptive streams, assign the video streams to a buffer queue for non-rate adaptive streams.

The above description is intended by way of example only.

What is claimed is:

1. A method comprising:
   at a video conference bridge configured to send and receive communications to an endpoint device in a network, receiving one or more video streams from the endpoint device participating in a video conference;
   determining whether the endpoint device is a rate adaptive endpoint device;
   if it is determined that the endpoint device is a rate adaptive endpoint device, obtaining signaling information from each of the one or more video streams and classifying each of the one or more video streams as a rate adaptive stream or as a non-rate adaptive stream based on the signaling information;
   if it is determined that the endpoint device is not a rate adaptive endpoint device, classifying each of the one or more video streams as a rate adaptive stream or as a non-rate adaptive stream based on a bit rate associated with each of the one or more video streams;
   for video streams classified as rate adaptive streams, assigning the video streams to a buffer queue for rate adaptive streams;
   for video streams classified as non-rate adaptive streams, assigning the video streams to a buffer queue for non-rate adaptive streams, wherein the buffer queue for rate adaptive streams is separate from the buffer queue for non-rate adaptive streams;
   determining a bandwidth for the buffer queue for rate adaptive streams and a bandwidth for the buffer queue for non-rate adaptive streams; and
   adjusting the bandwidth for the buffer queue for rate adaptive streams and the bandwidth for the buffer queue for non-rate adaptive streams based at least in part on network conditions.

2. The method of claim 1, wherein the signaling information comprises Real-time Transport Control Protocol signaling information.

3. The method of claim 1, wherein classifying each of the one or more video streams as a rate adaptive stream or as a non-rate adaptive stream based on a bit rate associated with each of the one or more video streams comprises:
   determining whether a bit rate of each of the one or more video streams has been increased to a maximum bit rate allowed in the network;

classifying a video stream as a non-rate adaptive stream if the bit rate of the video stream has been increased to the maximum bit rate allowed; and classifying the video stream as a rate adaptive stream if the bit rate of the video stream has not been increased to the maximum bit rate allowed.

4. The method of claim 1, wherein determining the bandwidth for the buffer queue for non-rate adaptive streams comprises:

determining a maximum bit rate for the buffer queue for each of a plurality of non-rate adaptive streams; and calculating the bandwidth for the buffer queue for non-rate adaptive streams according to a formula:

$$BW_{non-RAS}=w(N)\Sigma maxBR(n), n=1, \ldots N,$$

where $BW_{non-RAS}$ is the bandwidth for the buffer queue for non-rate adaptive streams, maxBR(n) is the maximum bit rate for each of the plurality of video streams in the buffer queue for non-rate adaptive streams and w(N) is a weighted factor.

5. The method of claim 1, wherein determining the bandwidth for the buffer queue for rate adaptive streams comprises:

determining a total allocated bandwidth for the video conference;

determining a remaining bandwidth by removing the bandwidth for the buffer queue for non-rate adaptive streams from the total allocated bandwidth; and allocating the remaining bandwidth to the buffer queue for rate adaptive streams.

6. The method of claim 1, further comprising:

admitting video streams classified as rate adaptive streams into a first Call Admission Control queue and video streams classified as non-rate adaptive streams into a second Call Admission Control queue; and setting a video stream capacity limit at a higher level for the first Call Admission Control queue relative to a video stream capacity limit for the second Call Admission Control queue.

7. The method of claim 6, wherein setting the video stream capacity limit comprises setting the video stream capacity limit at the higher level for the first Call Admission Control queue such that the higher level allows for an oversubscription in the first Call Admission Control queue for the video streams allowed in the first Call Admission Control queue.

8. The method of claim 6, wherein admitting comprises admitting the rate adaptive streams and the non-rate adaptive streams into respective Call Admission Control queues separately.

9. The method of claim 1, wherein each of the buffer queue for rate adaptive streams and the buffer queue for non-rate adaptive streams is configured with a minimum guaranteed bandwidth.

10. The method of claim 1, wherein the network conditions include at least one of a total number of video streams assigned to the non-rate adaptive buffer queue and a maximum bit rate for each of the video streams assigned to the non-rate adaptive buffer queue.

11. One or more non-transitory computer readable storage media encoded with software comprising computer executable instructions and when the software is executed operable to:

receive one or more video streams from an endpoint device participating in a video conference;

determine whether the endpoint device is a rate adaptive endpoint device;

if it is determined that the endpoint device is a rate adaptive endpoint device, obtain signaling information from each of the one or more video streams and classify each of the one or more video streams as a rate adaptive stream or as a non-rate adaptive stream based on the signaling information;

if it is determined that the endpoint device is not a rate adaptive endpoint device, classify each of the one or more video streams as a rate adaptive stream or as a non-rate adaptive stream based on a bit rate associated with each of the one or more video streams;

for video streams classified as rate adaptive streams, assign the video streams to a buffer queue for rate adaptive streams, for video streams classified as non-rate adaptive streams, assign the video streams to a buffer queue for non-rate adaptive streams, wherein the buffer queue for rate adaptive streams is separate from the buffer queue for non-rate adaptive streams;

determine a bandwidth for the buffer queue for rate adaptive streams and a bandwidth for the buffer queue for non-rate adaptive streams; and adjust the bandwidth for the buffer queue for rate adaptive streams and the bandwidth for the buffer queue for non-rate adaptive streams based at least in part on network conditions.

12. The non-transitory computer readable storage media of claim 11, wherein the instructions operable to classify each of the one or more video streams as a rate adaptive stream or as a non-rate adaptive stream based on a bit rate associated with each of the one or more video streams comprise instructions operable to:

determine whether a bit rate of each of the one or more video streams has been increased to a maximum bit rate allowed in the network;

classify a video stream as a non-rate adaptive stream if the bit rate of the video stream has been increased to the maximum bit rate allowed; and classify a video stream as a rate adaptive stream if the bit rate of the video stream has not been increased to the maximum bit rate allowed.

13. The non-transitory computer readable storage media of claim 11, wherein the instructions operable to determine the bandwidth for the buffer queue for the non-rate adaptive streams comprise instructions operable to:

determine a maximum bit rate for the buffer queue for each of a plurality of non-rate adaptive streams; and calculate the bandwidth for the buffer queue for non-rate adaptive streams according to a formula:

$$BW_{non-RAS}=w(N)\rho maxBR(n), n=1, \ldots N,$$

where $BW_{non-RAS}$ is the bandwidth for the buffer queue for non-rate adaptive streams, maxBR(n) is the maximum bit rate for each of the plurality of video streams in the buffer queue for non-rate adaptive streams and w(N) is a weighted factor.

14. The non-transitory computer readable storage media of claim 11, wherein the instructions operable to determine the bandwidth for the buffer queue for the rate adaptive streams comprise instructions operable to:

determine a total allocated bandwidth for the video conference;

determine a remaining bandwidth by removing the bandwidth for the buffer queue for non-rate adaptive streams from the total allocated bandwidth; and allocate the remaining bandwidth to the buffer queue for rate adaptive streams.

15. The non-transitory computer readable storage media of claim 11, further comprising instructions operable to:
admit video streams classified as rate adaptive streams into a first Call Admission Control queue and video streams classified as non-rate adaptive streams into a second Call Admission Control queue; and
set a video stream capacity limit at a higher level for the first Call Admission Control queue relative to a video stream capacity limit for the second Call Admission Control queue.

16. The non-transitory computer readable storage media of claim 11, wherein each of the buffer queue for rate adaptive streams and the buffer queue for non-rate adaptive streams is configured with a minimum guaranteed bandwidth.

17. An apparatus comprising:
a network interface unit configured to enable communications over a network; and
a processor coupled to the network interface unit, and configured to:
receive one or more video streams from an endpoint device participating in a video conference;
determine whether the endpoint device is a rate adaptive endpoint device;
if it is determined that the endpoint device is a rate adaptive endpoint device, obtain signaling information from each of the one or more video streams and classify each of the one or more video streams as a rate adaptive stream or as a non-rate adaptive stream based on the signaling information;
if it is determined that the endpoint device is not a rate adaptive endpoint device, classify each of the one or more video streams as a rate adaptive stream or as a non-rate adaptive stream based on a bit rate associated with each of the one or more video streams;
for video streams classified as rate adaptive streams, assign the video streams to a buffer queue for rate adaptive streams,
for video streams classified as non-rate adaptive streams, assign the video streams to a buffer queue for non-rate adaptive streams, wherein the buffer queue for rate adaptive streams is separate from the buffer queue for non-rate adaptive streams;
determine a bandwidth for the buffer queue for rate adaptive streams and a bandwidth for the buffer queue for non-rate adaptive streams; and
adjust the bandwidth for the buffer queue for rate adaptive streams and the bandwidth for the buffer queue for non-rate adaptive streams based at least in part on network conditions.

18. The apparatus of claim 17, wherein the processor, when classifying each of the one or more video streams as a rate adaptive stream or as a non-rate adaptive stream based on a bit rate associated with each of the one or more video streams, is further configured to:
determine whether a bit rate of each of the video streams has been increased to a maximum bit rate allowed in the network;
classify a video stream as a non-rate adaptive stream if the bit rate of the video stream has been increased to the maximum bit rate allowed; and
classify a video stream as a rate adaptive stream if the bit rate of the video stream has not been increased to the maximum bit rate allowed.

19. The apparatus of claim 17, wherein the processor is further configured to:
admit video streams classified as rate adaptive streams into a first Call Admission Control queue and video streams classified as non-rate adaptive streams into a second Call Admission Control queue; and
set a video stream capacity limit at a higher level for the first Call Admission Control queue relative to a video stream capacity limit for the second Call Admission Control queue.

20. The apparatus of claim 17, wherein each of the buffer queue for rate adaptive streams and the buffer queue for non-rate adaptive streams is configured with a minimum guaranteed bandwidth.

21. The method of claim 17, wherein the network conditions include at least one of a total number of video streams assigned to the non-rate adaptive buffer queue and a maximum bit rate for each of the video streams assigned to the non-rate adaptive buffer queue.

* * * * *